United States Patent [19]

Dubots et al.

[11] Patent Number: 5,314,675

[45] Date of Patent: May 24, 1994

[54] PROCESS FOR DIRECT NITRIDING OF METALS OF LOW MELTING POINT

[76] Inventors: Dominique Dubots, 107, rue des Moranches, Chedde 74190 Passy; Pierre Faure, Le Gite, 38210 Saint Quentin sur Isere, both of France

[21] Appl. No.: 816,235

[22] Filed: Jan. 3, 1992

[30] Foreign Application Priority Data

Jan. 3, 1991 [FR] France .................. 91 00376

[51] Int. Cl.$^5$ .................. C04B 35/56; C01B 21/06
[52] U.S. Cl. .................. 423/344; 501/96
[58] Field of Search .................. 501/96, 97, 98; 423/344, 345; 419/27; 264/65

[56] References Cited

U.S. PATENT DOCUMENTS

| | | | |
|---|---|---|---|
| 2,929,126 | 3/1960 | Bollack | 25/157 |
| 3,839,541 | 10/1974 | Lumby et al. | 423/344 |
| 4,877,759 | 10/1989 | Holt et al. | 501/96 |
| 4,944,930 | 7/1990 | Holt et al. | 423/344 |
| 4,990,180 | 2/1991 | Halverson et al. | 75/239 |
| 5,030,600 | 7/1991 | Hida et al. | 501/98 |

FOREIGN PATENT DOCUMENTS

| | | |
|---|---|---|
| 165707 | 5/1985 | European Pat. Off. . |
| 1057005 | 5/1959 | Fed. Rep. of Germany . |
| 1149539 | 12/1957 | France . |
| 2075965 | 5/1981 | United Kingdom . |

*Primary Examiner*—Mark L. Bell
*Assistant Examiner*—A. Wright
*Attorney, Agent, or Firm*—Pollock, Vande Sande & Priddy

[57] ABSTRACT

Process for direct nitriding of metals of relatively low melting point with the aid of a nitrogen-containing gas, in which a powder of at least one of the metals is mixed with a refractory powder, the mixture is heated under an atmosphere of nitrogen-containing gas at atmospheric pressure until the start of a rapid and exothermic nitriding reaction, and this reaction, which proceeds at a temperature generally higher than that of the melting point of the metals without apparent melting being observed, is allowed to proceed until all of the metals have been consumed, in order to obtain a highly porous solid mass which is easy to grind and is based on metal nitrides or metal oxynitrides.

9 Claims, No Drawings

PROCESS FOR DIRECT NITRIDING OF METALS OF LOW MELTING POINT

TECHNICAL FIELD

The invention relates to a process for direct nitriding of metals of low melting point, i.e., usually meltable at a temperature below their nitriding temperature, leading to the production of nitrides or of nitrided products such as oxynitrides or oxycarbonitrides. It is applicable, for example, to the production of Al nitrides or Mg nitrides.

PRIOR ART

The nitrides of metals of low melting point, such as Al, are generally obtained by a carbonitriding reaction of oxides, for example alumina, at high temperature. Such a reaction, which is generally endothermic, consumes energy and usually proceeds at about 1700° C. in continuous furnaces or furnaces for batch operation. In order to obtain a pure product, these furnaces are often complex with very sharp temperature profiles with a view to obtaining a complete conversion and to preventing secondary reactions. The investments are therefore significant and the costs high.

It is for this reason that the applicants have turned to the development of a process by direct synthesis.

However, direct nitriding of this type, for example using Al and $N_2$ as starting materials, is very difficult. In fact, it must be carried out at a temperature higher than the melting point of Al and, although the metals in powder form nitride fairly readily in the solid state, they are very difficult to nitride in the liquid state: no simple technical solution is known for carrying out the direct and total nitriding of a liquid metal.

DESCRIPTION OF THE INVENTION

The invention is a process for direct nitriding of finely divided metals of relatively low melting point with the aid of a nitrogen-containing gas, in which a powder of at least one of the metals is mixed with a non-fusible refractory powder, the mixture is heated under an atmosphere of nitrogen-containing gas at atmospheric pressure until the start of a rapid and exothermic nitriding reaction of the metal and the reaction, which generally proceeds at a temperature higher than that of the melting point of the metals without apparent melting being observed, is allowed to proceed until all of the metal has been consumed, in order to obtain a highly porous solid mass which is easy to grind and is based on metal nitrides or metal oxynitrides.

The metals which are the subject of the present invention are generally those having a melting point which is lower than, or close to, the temperature at which they are nitrided by a nitrogen-containing gas. However, by extension, the invention may also relate to metals having a melting point higher than their nitriding temperature; inasmuch as direct nitriding of the metals gives rise to local overheating leading to local melting phenomena of the metal, the latter would then not be further nitrided and would be found in the metallic state in the final nitride, in order significantly to modify the grade (purity) thereof.

The nitrogen-containing gas used may be nitrogen, ammonia or hydrazine, on their own or as mixtures, or diluted with an inert or reducing gas.

The invention therefore comprises mixing a metal powder with a refractory powder which is non-fusible or has a melting point at sufficiently high temperatures relative to the temperature of the nitriding reaction.

The pulverulent mixture is first brought to a temperature such that, under a stream of nitrogen-containing gas and at a pressure close to atmospheric pressure, the nitriding reaction starts at least at one point in the batch. This reaction generally starts at a temperature higher than the melting point of the metal; it is rapid and exothermic and continues by itself without external supply of heat being necessary; such a supply of heat, may, however, be useful in order to improve the homogeneity of the reaction. The pressure may, however, be close to but higher than atmospheric pressure in order to prevent any return of parasitic air into the reaction chamber or to promote the rise in temperature of the starting mixture.

Although the temperature obtained at the start of, or during, the reaction is usually higher than that of the melting point of the metal, no apparent melting of the mixture is observed if there is a correct proportion between metal and refractory.

As the nitriding reaction is rapid and exothermic, and in order to prevent it from becoming violent (which would be to the detriment of the quality of the product obtained), the reaction temperature is generally controlled by adjusting the flow rate of the nitrogen-containing gas. It is sometimes essential to restrict the reaction temperature in order to prevent it from reaching the dissociation temperature of the nitrides formed.

The stream of gas may pass over the mixture in the furnace, or preferably percolate through the latter, which makes it possible to prevent coalescence of the particles during the reaction.

The product is obtained in the form of nitrides mixed or combined with the refractory support. It is in the form of a highly porous solid mass which is agglomerated to a greater or lesser extent and has no mechanical strength. The pore volume largely exceeds 50% and the pore diameter depends on the particle size of the starting powders; it may range from 1 $\mu$m to more than 200 $\mu$m. The bond between the particles is not very strong, which makes it possible easily to reduce the mass to powder form, for example by simple crumbling or easy grinding.

The metals which are particularly worthwhile for direct nitriding according to the invention are Al, Mg and Si (this metal being capable of undergoing local melting during its nitriding) and more generally the alkaline earth metals, but also their alloys or their mixtures, in particular those which can be melted at low temperature.

The refractory support must have a geometric surface which is sufficiently large and wettable by the liquid metal which it is desired to nitride. For this reason it be essential that it is in the form of a more or less fine powder.

Its chemical nature must be chosen such that it does not react with the metal to be nitrided. On the other hand, the nitride formed during the reaction may combine with the refractory support to give a compound which is non-fusible under the reaction conditions, such as, for example, the oxynitrides.

Thus, it is possible to use all types of refractory supports, for example refractory oxides such as $Al_2O_3$, MgO, CaO, $SiO_2$ and dolomite, . . . or their compounds, nitrides (such as AlN and $Si_3N_4$), carbides, borides, oxynitrides, oxycarbides, oxycarbonitrides and their refractory mixtures.

The refractory support generally has a particle size of less than 600 μm; the particle size of the metal to be nitrided usually does not exceed 2 mm and is preferably less than 1 mm. The particle size may be larger the lower the melting point of the metal to be nitrided; for example, Al particles may be up to 1.2 mm, whereas it is preferable not to exceed 0.16 mm in the case of Si, which melts at a very much higher temperature.

The proportion of metal particles relative to the finely divided refractory support may vary within a wide range. It may very low, for example 1%. On the other hand, it is imperative to prevent any apparent melting by restricting the proportion of metal to a maximum value: it is difficult to exceed ⅓ for the ratio metal/(metal+support). In fact, beyond this value there is a risk of apparent melting of the batch, which causes nitriding to stop and gives a mixture of nitride and non-nitrided metal as the end product, which is not the desired aim.

The choice of refractory support depends on the nature of the end product which it is desired to produce.

Thus, without any restriction being implied, various occurrences may be mentioned:

when the metal powder to be nitrided is in the presence of a refractory support consisting of a powder of its oxide, a simple oxynitride is finally obtained (for example Al in the presence of $Al_2O_3$ gives AlON and Mg in the presence of MgO gives the mixture $Mg_3N_2+MgO...$);

when the metal powder is in the presence of an oxide of another metal, a double oxynitride is obtained (for example Al in the presence of MgO gives an oxynitride of the MgAlON type, which may be regarded as a AlON spinel, a solid solution of AlN in MgO);

when the metal powder is in the presence of its own nitride, a nitride is obtained which may be of high purity (for example Al in the presence of AlN); and when the metal powder is in the presence of a mixture of oxide and carbide, it is possible to obtain an oxycarbonitride of a single metal or of different metals, etc.

It is thus possible to obtain nitride-based compounds of all types: mixed nitrides when the refractory support is a nitride of a metal other than the metal to be nitrided, mixed nitride/carbide or nitride/boride compounds, but also compounds obtained from a support which is a non-fusible mixture of refractory powders.

It is thus found, surprisingly, that the metals which are difficult to nitride in the liquid state (in particular Al and Mg) are capable, according to the invention, of nitriding completely even at temperatures higher than their melting point, on condition, as already stated, that the metal powder to be nitrided is dispersed in the finely divided refractory solid which has a solid and inert surface of sufficiently large area. The pulverulent products, obtained according to the invention, whether they are nitrides combined or mixed with the refractory support, may then be subjected to melting, for example electrothermal melting. This is particularly valuable in order to complete the combination of the mixture or mixtures obtained with the refractory support or supports with a view to obtaining, for example, a homogeneous product. The oxynitrides are very suitable for this electrofusion to give products which have desirable properties, for example good resistance to corrosion at high temperature, etc.

The process according to the invention generally gives rise to a self-maintained nitriding reaction which does not require external supply of energy, which makes it economical.

The process according to the invention also makes it possible, by means of a simple technique, to obtain a wide variety of nitride-based products or to obtain nitrides having a purity which depends only on the purity of the consumable starting compounds. This is highly valuable, in particular for the easy production of pure AlN in large amounts.

EXAMPLE 1

This example illustrates the production of a simple oxynitride.

100 kg of alumina in powder form having a particle size of less than 100 μm were mixed with 30 kg of aluminum in powder form having a particle size of less than 1.2 mm. This mixture was placed in a leaktight furnace, degassed under vacuum and then heated under a nitrogen pressure of 1 atm.

Nitriding started at about 700° C. and the nitrogen pressure was maintained atm 1 at in order to promote the rise in temperature of the batch. Although the reaction is exothermic, heating of the furnace was maintained, which enabled a temperature of 1750° C. to be reached at the end of the operation.

At the end of the operation, 145 kg of a slightly solid homogeneous porous mass consisting of AlON were recovered. The mass was remelted in an arc furnace provided w vessel of the "water jacket" type and no evolution of gas was observed in the bath. The molten product was cast and cooled. Analysis showed it indeed to be an aluminum oxynitride containing 10.1% of nitrogen.

EXAMPLE 2

This example illustrates the production of a double oxynitride.

40 kg of an aluminum powder (average particle size about 1 mm) and 60 kg of ground magnesia powder having a particle size of less than 250 μm were mixed. The mixture was slightly agglomerated, in the form of large pellets, in order to facilitate handling. These pellets were introduced into a furnace, degassed and heated up to 960° C. under a nitrogen atmosphere at atmospheric pressure. After the start of nitriding, the temperature rose to 1680° C. The complete operation took 45 minutes. At no time was apparent melting of the batch observed.

The porous product obtained contained a mixed oxynitride MgAlON.

An identical experiment was carried out without agglomerating the starting mixture; the same product was obtained in the form of a solid mass which was easily ground in the form of a powder having a particle size of about 200 to 300 μm.

EXAMPLE 3

This example illustrates the production of the same product by another variant of the process.

A mixture of 38 kg of Mg in powder form (particle size between 50 and 100 μm) and 68 kg of an alumina powder (particle size less than 100 μm) was prepared, which was converted to agglomerates. The latter were heated up to 700° C. under a nitrogen atmosphere, nitriding then started and the temperature was limited to 1100° C. by adjusting the nitrogen flow rate. Nitriding was complete within 30 minutes.

The agglomerates obtained comprised a mixture of $Mg_3N_2$, $Al_2O_3$ and mixed oxynitride MgAlON.

In the same way, the non-agglomerated starting mixture led to a friable porous solid.

EXAMPLE 4

This example illustrates the production of pure AlN from a simple mixture of powders.

A mixture comprising 40% of Al powder having a particle size of less than 1 mm and 60% of AlN powder having a particle size of less than 600 $\mu$m, previously obtained by a carbonitriding process, was prepared.

This mixture was introduced into an electrically heated furnace of small dimensions, which was brought progressively to 1300° C. under a stream of nitrogen; the direct nitriding reaction of aluminum suddenly started at this temperature, giving rise to a significant rise in temperature in the batch up to 1700° C.

The conversion of the aluminum to nitride was complete and rapid; the batch obtained was agglomerated without any trace of melting being observed and was reduced to powder form by gentle grinding.

EXAMPLE 5

This example illustrates the production of AlN from agglomerated powders.

The starting material was a AlN powder, obtained in Example 4, having a particle size of less than 600 $\mu$m, mixed with the Al powder from Example 4 in the same proportion.

This mixture was agglomerated and then heated under a nitrogen atmosphere as above.

Nitriding started at 1200° C. and a temperature of 1680° C. was then reached.

The conversion was complete and rapid.

Repeating this operation, without agglomeration, using Al assaying 99.9% and nitrogen free from $O_2$ enabled AlN assaying 99.8% and less than 0.1% of non-combined Al to be obtained.

EXAMPLE 6

This example illustrates the production of AlN in an industrial furnace.

6.8 t of a pulverulent mixture of the same nature and proportions as in Example 5 was introduced into a furnace having a chamber of large dimensions under a nitrogen overpressure. The batch was heated with the aid of a graphite resistor submerged in the mixture.

The reaction started locally and then extended to the entire batch, heating being stopped.

The AlN content of the product obtained is 99.3%.

EXAMPLE 7

This example illustrates the production of a metal (Si) nitride which can be the subject of local melting during its direct nitriding. Direct nitriding according to the prior art and according to the invention will thus be compared.

a) according to the prior art:

100 kg of 0–160 $\mu$m silicon in powder form were prepared, from which a 50 kg fraction was taken, which was heated in a furnace under a nitrogen atmosphere. By controlling the nitrogen supply so as not to exceed about 1350° C., a sintered mass of $Si_3N_4$ was obtained containing about 6% of Si which had not reacted and having microspheres, mainly located in its center. These microspheres are due to local overheating and melting during the reaction.

Thus, although in principle the melting point of silicon was not reached, localized melting, which has the consequence of incomplete nitriding of the silicon, was nevertheless observed.

b) according to the invention:

The second 50 kg fraction of Si powder was mixed with 25 kg of $Si_3N_4$ powder, obtained by grinding the outer zones of the mass obtained above and free of free Si.

The nitriding operation on this mixture was carried out under conditions identical to those of the preceding operation.

At the end of the operation, the agglomerated mass of $Si_3N_4$ obtained contained less than 0.1% of free Si, even in the central zone of the mass.

EXAMPLE 8

This example illustrates the nitriding of a mixture of metal (Al+Mg) powders on a support of ground magnesia powder.

535 g of a ground magnesia powder having a particle size of less than 630 $\mu$m were mixed with 72 g of magnesium powder having a particle size of 50–300 $\mu$m and 54 g of aluminum sprayed to form spheres approximately 1.2 mm in diameter.

The whole was placed in a leaktight furnace under a nitrogen pressure of 1 atm; the flow rate may be controlled by means of a valve. The nitriding reaction started at about 600° C. and the nitriding temperature was maintained at 1000° C. by adjusting the nitrogen flow rate.

At the end of the operation, 715 g of a slightly sintered powder were recovered, in which all of the metals were nitrided and which contained a double oxynitride MgAlON (as in Examples 1 and 2), but also $Mg_3N_2$, AlN and a mixture of the oxides (MgO, $Al_2O_3$) which had not reacted with the nitrides.

This powder was remelted by electromelting in order to obtain an electromolten mass consisting of oxynitride MgAlON.

EXAMPLE 9

This example illustrates the use of a complex refractory support (dolomite).

610 kg of a ground calcined dolomite powder having a particle size of less than 630 $\mu$m and containing 61% CaO and 37% MgO were mixed with 66 kg of a calcined and ground magnesite powder of the same particle size and 111 kg of aluminum granules having a particle size of about 1.2 mm.

This mixture was agglomerated and then placed in a leaktight furnace under nitrogen pressure.

The nitriding reaction started at about 960° C. Heating of the furnace was controlled with the aid of the nitrogen flow rate so as to obtain a reaction temperature of the order of 1700° C.

The product obtained after removal from the furnace was in the form of a porous solid mass weighing 842 kg and consisting of a triple oxynitride of Ca, Mg and Al, which was easy to crush to obtain agglomerates, which were also porous.

This mixture in its original non-agglomerated form was also treated under the same nitriding conditions and a porous solid mass was obtained which was easily ground in order to convert it to a powder.

We claim:

1. A process for mass producing products based on metallic nitride or oxynitride, said process comprising the steps of:
   (a) mixing a metallic powder comprising at least one metal with a refractory powder infusible and inert with respect to said metallic powder in operating conditions of said process to obtain a bulk mixture, the metallic powder content of said bulk mixture not exceeding 66.67% of said bulk mixture;
   (b) heating said bulk mixture in a furnace under a flow of nitrogen-containing gas at approximately atmospheric pressure until a rapid and exothermic nitriding reaction of said metal begins;
   (c) controlling a nitriding temperature of said nitriding reaction at which said metallic powder melts at least partially by means of said flow of nitrogen-containing gas so as to self-maintain said nitriding reaction until said powder is completely nitrided and to avoid any apparent trace of melting in said bulk mixture; and
   (d) obtaining said products in the form of a highly porous bulk solid which is easy to grind and which is capable of being melted.

2. Process according to claim 1, wherein said metallic powder has a melting point lower than a temperature at which nitriding occurs.

3. Process according to claim 1, wherein said metals have a melting point higher than said nitriding temperature but are susceptible of localized melting phenomena due to localized overheating during said nitriding reaction.

4. Process according to claim 2 or 3, wherein said metals are selected from the group consisting of Al, Mg, Si, their alloys and their mixtures.

5. Process according to any one of claims 1 to 3, wherein said refractory powder is selected from the group consisting of refractory oxides, compounds of refractory oxides, nitrides, carbides, borides and mixtures thereof.

6. Process according to any one of claims 1 to 3, wherein said refractory powder has a particle size of less than 600 μm and the metals to be nitrided have a particle size of less than 2 mm.

7. Process according to any one of claims 1 to 3, wherein said nitrogen-containing gas is pure nitrogen.

8. Process according to any one of claims 1 to 3, wherein said nitrogen-containing gas is nitrogen diluted with an inert or reducing gas.

9. Process according to any one of claims 1 to 3, wherein the starting bulk mixture comprises a metal, as metallic powder, and a nitride of said metal, as refractory powder.

* * * * *